United States Patent
Bogin et al.

(10) Patent No.: US 7,370,125 B2
(45) Date of Patent: May 6, 2008

(54) STREAM UNDER-RUN/OVER-RUN RECOVERY

(75) Inventors: Zohar Bogin, Folsom, CA (US); Brent D. Chartrand, Cameron Park, CA (US); Arthur D. Hunter, Jr., Cameron Park, CA (US); Mihir Shah, Philadelphia, PA (US)

(73) Assignee: Intel Corporation, Santa Clara, CA (US)

( * ) Notice: Subject to any disclaimer, the term of this patent is extended or adjusted under 35 U.S.C. 154(b) by 459 days.

(21) Appl. No.: 10/723,135

(22) Filed: Nov. 25, 2003

(65) Prior Publication Data

US 2005/0114564 A1    May 26, 2005

(51) Int. Cl.
*G06F 13/12* (2006.01)
*G06F 15/16* (2006.01)

(52) U.S. Cl. .......................... 710/52; 709/231

(58) Field of Classification Search ............... None
See application file for complete search history.

(56) References Cited

U.S. PATENT DOCUMENTS

| | | |
|---|---|---|
| 5,303,302 A * | 4/1994 | Burrows .................. 713/161 |
| 5,452,432 A | 9/1995 | Macachor |
| 5,530,941 A | 6/1996 | Weisser et al. |
| 5,664,197 A | 9/1997 | Kardach et al. |
| 5,678,009 A | 10/1997 | Bains et al. |
| 5,708,849 A | 1/1998 | Coke et al. |
| 5,729,762 A | 3/1998 | Kardach et al. |
| 5,751,994 A | 5/1998 | Weisser et al. |
| 5,794,070 A | 8/1998 | Rabe et al. |
| 5,805,842 A | 9/1998 | Nagaraj et al. |
| 5,862,387 A | 1/1999 | Songer et al. |
| 5,996,038 A | 11/1999 | Looi et al. |
| 6,108,743 A | 8/2000 | Debs et al. |
| 6,119,189 A | 9/2000 | Gafken et al. |
| 6,131,127 A | 10/2000 | Gafken et al. |
| 6,151,654 A | 11/2000 | Poisner et al. |
| 6,157,970 A | 12/2000 | Gafken et al. |
| 6,275,242 B1 | 8/2001 | Shah et al. |
| 6,363,428 B1 | 3/2002 | Chou et al. |
| 6,385,671 B1 | 5/2002 | Hunsaker et al. |
| 6,401,144 B1 | 6/2002 | Jones |
| 6,438,686 B1 | 8/2002 | Daughtry et al. |
| 6,560,657 B1 | 5/2003 | Gandhi et al. |

(Continued)

FOREIGN PATENT DOCUMENTS

GB    2 283 152 A    4/1995

(Continued)

OTHER PUBLICATIONS

Brent Chartrand, "Enabling 3rd Generation PC Audio", PowerPoint Presentation, Apr. 9-11, 2003, Intel Corporation.

(Continued)

*Primary Examiner*—Alford Kindred
*Assistant Examiner*—David Martinez
(74) *Attorney, Agent, or Firm*—Guojun Zhou

(57) ABSTRACT

Machine-readable media, methods, and apparatus are described to recover from stream under-run and/or over-run conditions. In some embodiments, an audio controller may discard any partial sample block of the stream.

14 Claims, 3 Drawing Sheets

U.S. PATENT DOCUMENTS

| | | | |
|---|---|---|---|
| 6,567,953 B1 | 5/2003 | Pomerantz | |
| 6,747,977 B1* | 6/2004 | Smith et al. | 370/395.64 |
| 2002/0018474 A1* | 2/2002 | Assa et al. | 370/395.71 |
| 2004/0260829 A1* | 12/2004 | Husak et al. | 709/232 |
| 2005/0149831 A1* | 7/2005 | Katsavounidis et al. | 714/776 |

FOREIGN PATENT DOCUMENTS

| WO | WO 03/050693 A | 6/2003 |
|---|---|---|

OTHER PUBLICATIONS

Abdul Jarrar: Enabling 3rd Generation pC Audio, Azalia Specification, Feb. 20, 2003 XP002328049.

PCT ISR WO dated Nov. 3, 2005.

International Application No. PCT/US2004/037460, Int'l. Preliminary Report on Patentability and Written Opinion.

* cited by examiner

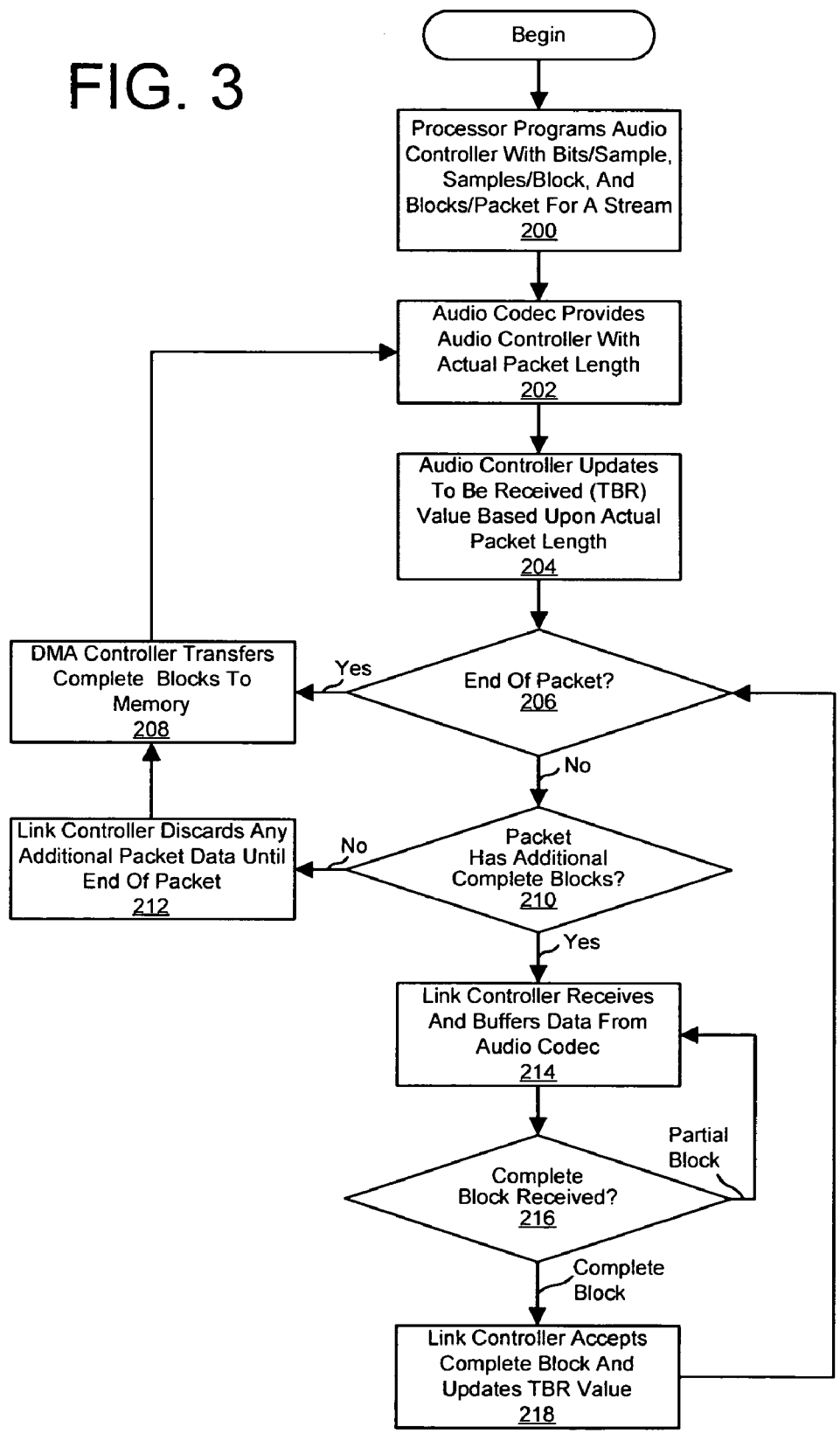

STREAM UNDER-RUN/OVER-RUN RECOVERY

BACKGROUND

An audio codec may provide an audio controller with more samples than the audio controller was programmed to accept. If the audio controller is unable to accept the additional samples, then the additional samples may be lost due to the over-run. Conversely, if the audio codec provides the audio controller with less data than the audio controller was programmed to accept, then the audio controller may interpret other data from the audio codec as one or more samples due to the under-run. Both under-run and over-run conditions may result in reduced audio quality and/or error conditions.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

FIG. 3 illustrates an embodiment of a flow control method of the audio controller of FIG. 1.

DETAILED DESCRIPTION

The following description describes data streaming techniques. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details.

In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

Figure 1:
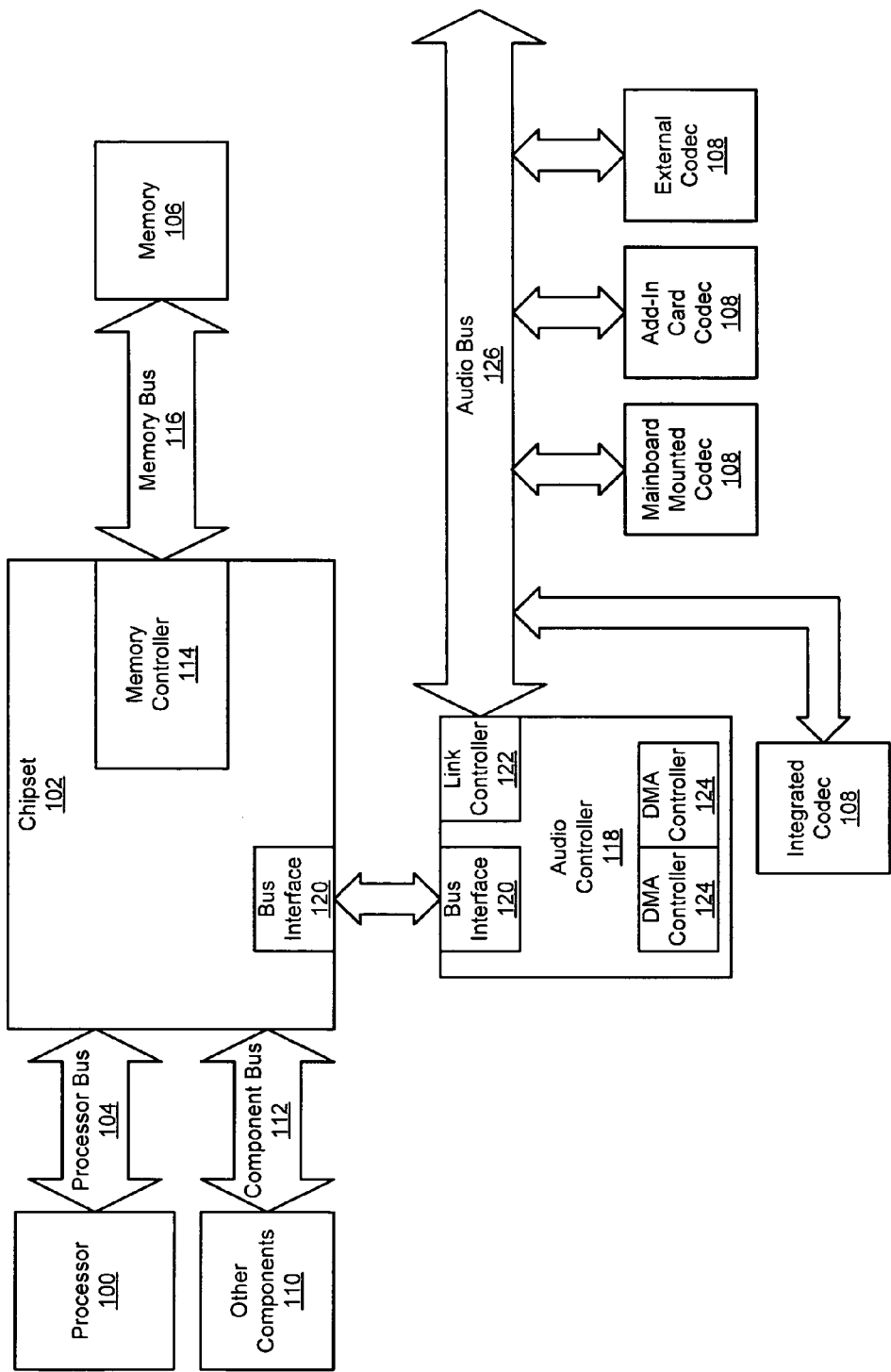
FIG. 1 illustrates an embodiment of a computing device with an audio controller.

An embodiment of a computing device is shown in FIG. 1. The computing device may comprise a processor 100 and a chipset 102 coupled to one another via a processor bus 104. The chipset 102 may comprise one or more integrated circuit packages or chips that couple the processor 100 to memory 106 and an audio controller 108. The chipset 102 may further couple the processor to other components 110 of the computing device such as, for example, BIOS firmware, keyboards, mice, storage devices, network interfaces, etc via one or more buses 112. In one embodiment, the chipset 102 may include a memory controller 114 to access memory 106 via a memory bus 116. The memory controller 114 may access the memory 106 in response to memory transactions associated with the processor 100, the audio controller 108, and other components 110 of the computing device. Further, the memory 106 may comprise various memory devices that provide addressable storage locations which the memory controller 114 may read data from and/or write data to. In particular, the memory 106 may comprise one or more different types of memory devices such as, for example, DRAM (Dynamic Random Access Memory) devices, SDRAM (Synchronous DRAM) devices, DDR (Double Data Rate) SDRAM devices, or other memory devices.

The audio controller 108 may control the flow of data between the memory 106 and audio codecs 118. The audio controller 108 may be integrated in the chipset 102. However, as depicted, the audio controller 108 may also be separate from the chipset 102. In such an embodiment, the audio controller 108 may comprise a bus interface 120, a link controller 122, and one or more DMA (direct memory access) controllers 124. The bus interface 120 of the audio controller 108 may couple the audio controller 108 to a bus interface 120 of the chipset 102 in order to interface the audio controller 108 to the memory 106 coupled to the memory controller 114 of the chipset 102.

The link controller 122 may provide the audio controller 108 with an interface to an audio bus 126 and the codecs 118 coupled to the audio bus 126 by controlling links between the audio controller 108 and the codecs 118. In one embodiment, the audio bus 126 may comprise one or more point-to-point serial input links from each codec 118 to the audio controller 108. The audio bus 126 may further comprise a broadcast serial output link from the audio controller 108 to the codecs 118. The link controller 122 may generate and receives frames 128 via the links of the audio bus 126 in accordance to an audio bus protocol.

In one embodiment, each DMA controller 124 may be separately programmed by the processor 100 to stream data between a buffer of the memory 106 and one or more audio codecs 118. The audio codecs 118 may correspond to sound cards, modems, fax machines, audio capture devices, etc that are incorporated and/or otherwise coupled to the computing device. In one embodiment, the audio codecs 118 may be integrated into the chipset 102, may be mounted to a mainboard of the computing device, may be mounted to an add-in card that is coupled to the computing device, and/or may be part of an external device such as, for example, a docking station, audio mixer, etc that is coupled to an interface port (not shown) of the computing device.

Figure 2:
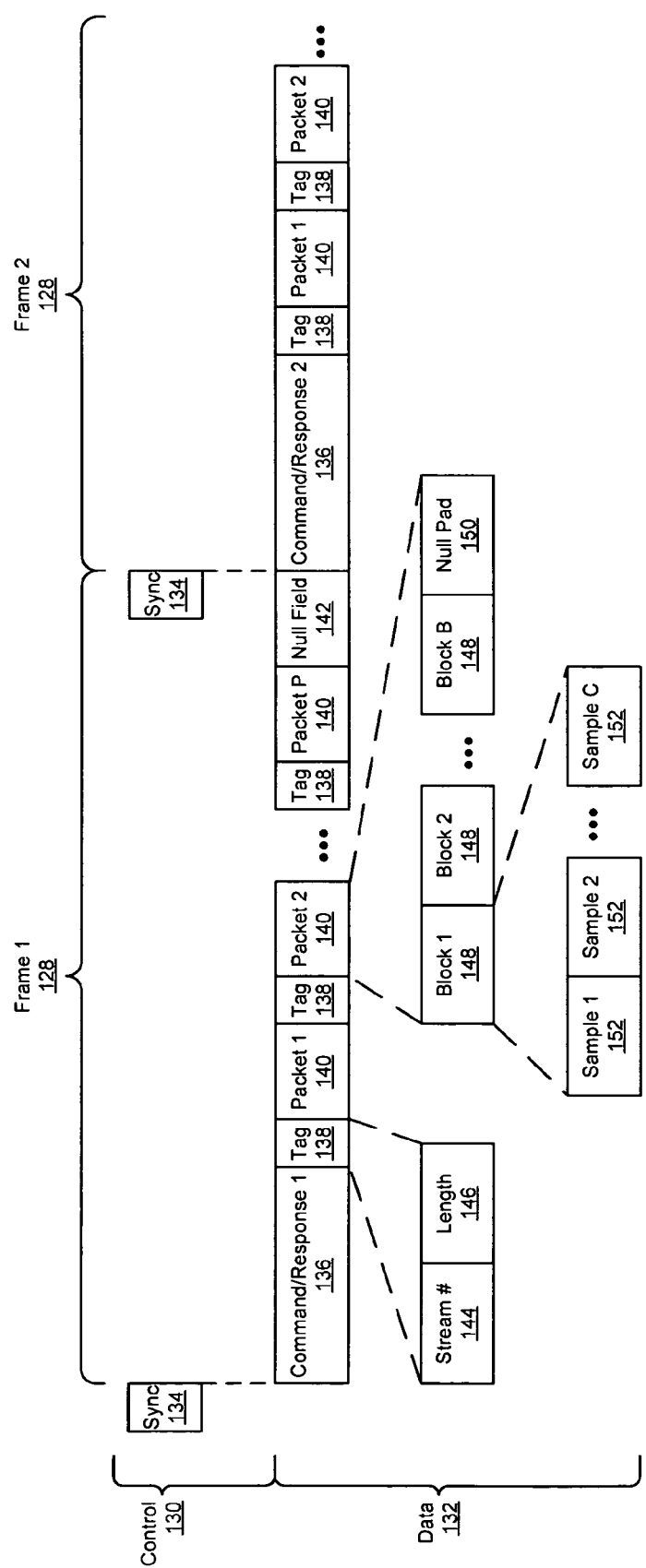
FIG. 2 illustrates an embodiment of a frame transferred by the audio controller of FIG. 1.

As illustrated in FIG. 2, the link controller 122 may receive audio streams from a codec 118 via frames 128 defined by control signals 130 of an audio bus control link and data signals 132 of an audio bus serial data input link. In particular, the control signals 130 may comprise frame syncs 134 to indicate the start of a frame 128. As illustrated, a frame 128 may comprise a command/response 136, one or more stream tags 138, one or more packets 140 and an optional null field 142. The command/response 136 may comprise a command that requests a receiver of the frame 128 to perform some action and/or may comprise a response to a command of a previous frame 128.

In general, the stream tags 138 may indicate the start of a packet 140, may identify to which stream the packet 140 is associated, and may indicate a length of the packet 140. In one embodiment, each stream tag 138 of the frame 128 may comprise a stream identifier (ID) 144 that indicates to which stream the packet 140 is associated. Further, each stream tag 138 may comprise an actual packet length 146 that indicates the length (e.g. number of bytes) of the following packet 140. The stream tags 138 may permit a codec 118 to transfer multiple streams and/or multiple packets 140 of a single stream during a single frame 128. Further, the null field 142 may comprise pad bits/bytes that extend the frame 128 to a fixed length or a multiple of some frame unit length. In another embodiment, the null field 142 may be associated with a quiescent period of an audio link in which no data is transmitted.

As shown, each packet 140 may comprise one or more sample blocks 148 and an optional null pad 150. The null pad 150 may pad the packet 140 to a fixed packet length or to a multiple of some packet unit length. In another embodiment, the null pad 150 may be associated with a quiescent period of an audio link in which no data is transmitted. Each sample block 148 of a packet 140 may comprise a separate sample 152 for each channel of a plurality of channels. For example, a stereo sample block 148 may comprise right channel sample 152 and left channel sample 152 that are associated with the same sample point in time of a stereo audio signal. Similarly, a 5.1 sample block 148 may comprise center channel sample 152, front right channel sample 152, front left channel sample 152, back right channel sample 152, back right channel sample 152, and bass channel sample 152 that are associated with the same sample point in time of a 5.1 channel audio signal.

In one embodiment, the processor 100 may program the audio controller 108 with characteristics of a stream to be transferred from a codec 118 to a buffer of the memory 106. In particular, the processor 100 may assign a DMA controller 124 to the stream, may set a sample length (e.g. a number of bits per sample 152), may set a sample block length (e.g. a number of bytes or a number of samples 152 per sample block 148), and may set an expected packet length (e.g. a number of sample blocks or a number of bytes per packet 140) to indicate an amount the codec 118 is expected to send during each packet 140.

In such an environment, an over-run may occur if the codec 118 sends a packet 140 having an actual packet length 146 greater than the expected packet length the audio controller 108 was configured to accept. In one embodiment, the audio controller 108 may recover from the above over-run by accepting the extra sample blocks 148 of the packet 140 because the extra sample blocks 148 are valid sample blocks 148 of the packet 140. An over-run/under-run may also occur if the codec 118 sends a packet 140 having an actual packet length 146 that is a non-integer multiple of the sample block length. In one embodiment, the audio controller 108 may recover from the over-run/under-run condition by dropping or discarding any partial sample block 148. Further, an under-run may occur if the codec 118 sends a packet 140 having an actual packet length 146 that is less than the expected packet length that the audio controller 124 was configured to accept. In one embodiment, the audio controller 124 may recover from the above under-run condition by only accepting the sent sample blocks 148 of the packet 140 since the sent sample blocks 148 are the only valid sample blocks 148 of the packet 140.

Shown in FIG. 3 is an embodiment of a method of the audio controller 108 to recover from stream over-runs and/or under-runs. In box 200, the processor 100 may program the audio controller 108 and/or the audio controller 108 may be otherwise configured to handle an audio stream of a codec 118. In one embodiment, the processor 100 may assign a stream to a DMA controller 124 of the audio controller 108 by providing the link controller 122 and/or the DMA controller 124 with a stream ID 144 for the stream. Further, the processor 100 may provide the link controller and/or the DMA controller 124 with a sample length, a sample block length, and an expected packet length of the stream.

In box 202, the audio controller 108 may receive from the codec 118 a stream tag 138 having a stream ID 144 and an actual packet length 146 that indicates the number of bytes of the packet 140 associated with the stream tag 138. The link controller 122 in box 204 may update a TBR (To Be Received) value based upon the received actual packet length 146. In one embodiment, the link controller 122 may update the TBR value by setting the TBR value equal to the received actual packet length 146 to indicate the number of bytes of the packet 140 yet to be received.

In box 206, the link controller 122 may determine whether the end of packet 140 has been reached. In one embodiment, the link controller 122 may determine that the end of the packet 140 has been reached based upon the TBR value for the packet 140. In particular, the link controller 122 may determine that the end of the packet 140 has been reached in response to the TBR value having a predetermined relationship (e.g. less than or equal) to a packet end value (e.g. 0). The link controller 122 may also determine that the end of the packet 140 has been reached in response to detecting a frame sync 134 that signals the start of the another frame 128 and/or a stream tag 138 that signals the start of another packet 140 of the frame 128.

In response to detecting the end of the packet 140, the link controller 122 in box 208 may cause the DMA controller 124 assigned to the stream of the received packet 140 to transfer the received complete sample blocks 148 to a buffer of the memory 106. As depicted, the DMA controller 124 may wait until the end of a stream prior to transferring the complete sample blocks 148 to the memory 106 which may increase the efficiency of the transfer to memory 106. However, in other embodiments, the DMA controller 124 may transfer the complete sample blocks 148 to memory 106 more frequently in order to reduce latency between when complete sample blocks 148 are received and when the complete sample blocks 148 are available in the memory 106.

However, if the link controller 122 does not detect the end of the packet 140, the link controller 122 may determine in box 210 whether one or more additional complete sample blocks 148 of the packet 140 may yet be received. In one embodiment, the link controller 122 may determine that additional complete sample blocks 148 may be received based upon the TBR value. In particular, the audio controller may determine that additional complete sample blocks 148 of the packet 140 may be received in response to determining that the TBR value has a predetermined relationship (e.g. less than or equal) to the sample block length of the packet 140. In response to determining that additional complete sample blocks 148 may not be received, the link controller 122 in box 212 may discard a partial sample block by discarding any received packet data until the end of the packet 140 is detected. In one embodiment, the link controller 122 may determine that the end of the packet 140 has been reached in response to detecting a frame sync 134 that signals the start of the next frame 128, a stream tag 138 that signals the start of another packet 140 of the frame 128, or the TBR value indicates the end of the current packet 140.

The link controller 122 in box 214 may buffer data received from the audio codec 118 and may monitor the control signal 130 for synchronization events such as, for example, frame syncs. In box 216, the link controller 122 may determine whether a complete sample block 148 has been received. In one embodiment, the link controller 122 may classify a sample block 148 having a defined number of bytes as a complete sample block 148 and a sample block 148 having less than the defined number of bytes as a partial sample block. In response to determining that a complete sample block 148 has been received, the DMA controller 124 in box 218 may accept the complete sample block 148 and may update the TBR value accordingly. In one embodiment, the DMA controller 124 may update the TBR value by subtracting the sample block length or the number of bytes of the complete sample block 148 from the TBR value. The DMA controller 124 may then return to box 206 in order to determine whether the end of the packet 140 has been reached. In response to determining that only a partial sample block 148 has been received thus far, the DMA controller 124 may return to box 214 in order to receive the remainder of the sample block 148.

Certain features of the invention have been described with reference to example embodiments. However, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A method comprising
receiving a packet comprising one or more sample blocks of a stream,
discarding any partial sample block of the packet that remains after detecting an end of the packet,
receiving an expected packet length indicative of a number of complete sample blocks for the packet,
receiving an actual packet length indicative of a number of complete sample blocks for the packet, and
accepting the number of complete sample blocks indicated by the actual packet length despite the expected packet length indicating fewer complete sample blocks than the actual packet length.

2. The method of claim 1 further comprising
receiving an actual packet length for the packet, and
detecting the end of the packet based upon the actual packet length.

3. The method of claim 1 further comprising detecting the end of the packet in response to receiving a sync signal of the stream.

4. The method of claim 1 further comprising detecting the end of the packet in response to detecting another packet of the stream.

5. The method of claim 1 further comprising
receiving an expected packet length indicative of a number of complete sample blocks for the packet,
receiving an actual packet length indicative of a number of complete sample blocks for the packet, and
accepting only the number of complete sample blocks of the packet indicated by the actual packet length despite the expected packet length indicating more complete sample blocks than the actual packet length.

6. The method of claim 1 further comprising transferring only complete sample blocks of the packet to a buffer of a memory.

7. The method of claim 1 further comprising classifying any sample block having less than a defined number of bytes as a partial sample block.

8. An article comprising a machine-readable medium that contains instructions, which when executed by a processing platform, cause said processing platform to perform operations comprising:
receiving a packet comprising one or more sample blocks of a stream, and
discarding any partial sample block of the packet that remains after detecting an end of the packet,
receiving an expected packet length indicative of a number of complete sample blocks for the packet,
receiving an actual packet length indicative of a number of complete sample blocks for the packet, and
accepting the number of complete sample blocks indicated by the actual packet length despite the expected packet length indicating fewer complete sample blocks than the actual packet length.

9. The article of claim 8, wherein said operations further comprise:
receiving an actual packet length for the packet, and
detecting the end of the packet based upon the actual packet length.

10. The article of claim 8, wherein said operations further comprise detecting the end of the packet in response to receiving a sync signal of the stream.

11. The article of claim 8, wherein said operations further comprise detecting the end of the packet in response to detecting another packet of the stream.

12. The article of claim 8, wherein said operations further comprise:
receiving an expected packet length indicative a number of complete sample blocks for the packet,
receiving an actual packet length indicative of a number of complete sample blocks for the packet, and
accepting only the number of complete sample blocks of the packet indicated by the actual packet length despite the expected packet length indicating more complete sample blocks than the actual packet length.

13. The article of claim 8, wherein said operations further comprise transferring only complete sample blocks of the packet to a buffer of a memory.

14. The article of claim 8, wherein said operations further comprise classifying any sample block having less than a defined number of bytes as a partial sample block.

\* \* \* \* \*